Dec. 6, 1927.  
A. B. JOHNSON  
CULTIVATOR  
Filed March 2, 1927
1,652,012
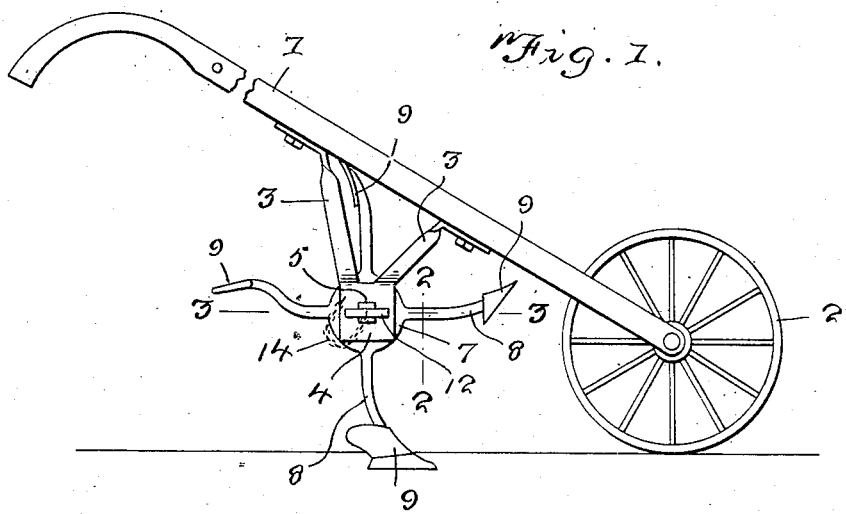
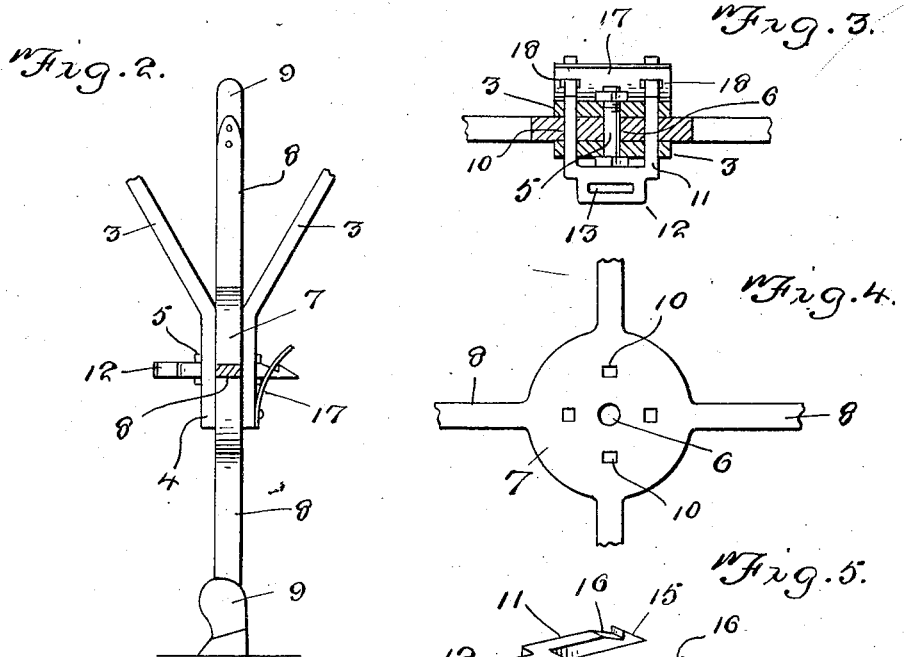
A. B. Johnson  
INVENTOR  
BY Victor J. Evans  
ATTORNEY Patented Dec. 6, 1927.

1,652,012

UNITED STATES PATENT OFFICE.

AUSTIN B. JOHNSON, OF WELLSBORO, PENNSYLVANIA.

CULTIVATOR.

Application filed March 2, 1927. Serial No. 172,054.

My present invention has reference to an agricultural implement designed for cultivating small fields or truck gardens and my object is the provision of a wheeled implement for this purpose that has pivotally associated therewith a spider whose arms carry different ground cultivating implements, together with simple but extremely novel means for locking the spider to effectively hold any of the implements in operative or ground engaging position.

To the attainment of the above broadly stated objects and others which will present themselves as the nature of the invention is better understood, the improvement also resides in certain other novel features of construction, combination and operative association of parts, one satisfactory embodiment of which is disclosed by the accompanying drawings.

In the drawings:

Figure 1 is a side elevation of my improvement.

Figure 2 is a sectional view approximately on the line 2—2 of Figure 1.

Figure 3 is a sectional view approximately on the line 3—3 of Figure 1.

Figure 4 is a face view of the hub portion of the spider.

Figure 5 is a perspective view of the locking key or bolt.

The frame of my improvement comprises a pair of spaced handles 1. Journaled in suitable bearing openings in the lower ends of the handles there is a shaft for the ground wheel 2 of the improvement.

Secured to and depending from the handles 1 there are oppositely arranged similarly constructed hangers 3. The hangers preferably each comprises a substantially rectangular plate 4 having at its upper edge angularly arranged arms and these arms have offset ends which are bolted or otherwise secured to the handle members 1. The body portion 4 of the hangers have centrally arranged round aligning openings therethrough for the reception of the removable pivot 5 which passes through a bearing opening 6 in the hub portion 7 of the spider. On each of the arms 8 of the spider there are formed or fixed cultivating implements 9. Each of the implements is of a different type employed in the cultivation of a field, those disclosed by the drawings being in the nature of a plowshare, a cultivator blade, a shovel and a hoe. Of course, the spider may be provided with any desired number of arms 8 and additional implements may be secured to these arms.

The hub 7, in a line with the respective arms 8, has circumferentially arranged squared openings 10 therethrough which align with similar openings in the body portion 4 of the hangers. Adapted to be passed through these openings there are the parallel arms 11 of a locking key or bolt 12. The arms 11 are connected, at one of their ends by a handle portion 13, and if desired, the handle portion 13 may be suspended from one of the hangers by a flexible element 14, as disclosed by Figure 1 of the drawings. The arms 11 are square in cross section, to correspond with the shape of the openings in the hub of the spider and in the hanger, the latter being provided with only two openings. The arms 11 have their outer ends or corners beveled, as at 15, and notched, as at 16. The body portion 4 of one of the hangers has fixed thereon the ends of a curved spring plate 17, the said spring plate being provided with openings 18 through which the beveled and notched ends of the arms 11 pass, the spring plate automatically moving into the notches in the arms and thereby effectively holding the locking key or bolt in active or operative position and effectively sustain the implement on one of the arms in ground engagement.

The simplicity of the improvement and the advantages thereof will, it is thought, be understood and appreciated by those skilled in the art to which the invention relates so that further detail description will not be required.

Having described the invention, I claim:—

1. An agricultural implement including handle members having a wheel journaled between one of the ends thereof and having depending hangers, a spider revolubly mounted between the hangers and having its arms carrying cultivating implements, and a locking key passing through the hangers and through the hub portion of the spider for locking the spider from turning on the hangers when any one of the implements on the spider is in ground engaging position.

2. An agricultural implement including handle members having a wheel journaled between one of the ends thereof and having depending hangers, a spider revolubly mounted between the hangers and having its arms carrying cultivating implements, a locking key passing through the hangers and through the hub portion of the spider for locking the spider from turning on the hangers when any one of the implements on the spider is in ground engaging position and spring means for holding the locking key in locking position.

3. An agricultural implement including handle members having a wheel journaled between one of the ends thereof and having depending hangers, a spider revolubly mounted between the hangers and having its arms carrying cultivating implements, a locking key passing through the hangers and through the hub portion of the spider for locking the spider from turning on the hangers when any one of the implements on the spider is in ground engaging position, said key comprising a substantially V-shaped member, having a handle part at its connected end and the outer corners of its arms notched and beveled, and a spring latching plate on one of the hangers having openings therethrough for the passage of the said arms and for engagement in the notches of said arms.

In testimony whereof I affix my signature.

AUSTIN B. JOHNSON.